United States Patent [19]

Hinson

[11] Patent Number: 5,515,613
[45] Date of Patent: May 14, 1996

[54] APPARATUS FOR AND METHOD OF MEASURING VEHICLE REFERENCE POINTS

[76] Inventor: Virgil H. Hinson, 49 Choctaw Sq., Brunswick, Ga. 31525

[21] Appl. No.: 352,062

[22] Filed: Nov. 30, 1994

[51] Int. Cl.⁶ .......................... G01B 5/25; G01B 11/27
[52] U.S. Cl. ................. 33/288; 33/608; 33/DIG.21
[58] Field of Search .................. 33/288, 608, DIG. 21; 72/392, 457, 705

[56] References Cited

U.S. PATENT DOCUMENTS

| | | | |
|---|---|---|---|
| 4,201,076 | 5/1980 | Jarman et al. | 72/392 |
| 4,329,784 | 5/1982 | Bjork | 33/180 |
| 4,513,508 | 4/1985 | Jarman et al. | 33/288 |
| 4,598,481 | 7/1986 | Donahue | 33/288 |
| 4,630,379 | 12/1986 | Wickmann et al. | 33/288 |
| 4,712,417 | 12/1987 | Jarman et al. | 72/447 |
| 4,839,590 | 6/1989 | Koski et al. | 324/208 |
| 4,932,236 | 6/1990 | Hinson | 72/447 |
| 5,027,639 | 7/1991 | Hinson | 72/457 |
| 5,058,286 | 10/1991 | Chisum | 33/288 |
| 5,199,289 | 4/1993 | Hinson | 72/457 |
| 5,239,854 | 8/1993 | Hinson | 72/457 |
| 5,257,526 | 11/1993 | Teixeria | 72/457 |
| 5,417,094 | 5/1995 | Chisum | 33/608 |

*Primary Examiner*—Christopher W. Fulton
*Attorney, Agent, or Firm*—Jacobson, Price, Holman & Stern

[57] ABSTRACT

A laser beam plane generator is provided and supported from a datum line vehicle body reference point measuring jig for generating either a vertical longitudinal laser beam plane parallel to the vertical centerline plane of the vehicle body, a vertical transverse laser beam plane normal to the datum line, or a horizontal laser beam plane. A hand-held wand type probe is used in conjunction with either of these laser beam planes to check and/or verify the spacing of specific vehicle reference points relative to a selected laser beam plane.

11 Claims, 6 Drawing Sheets

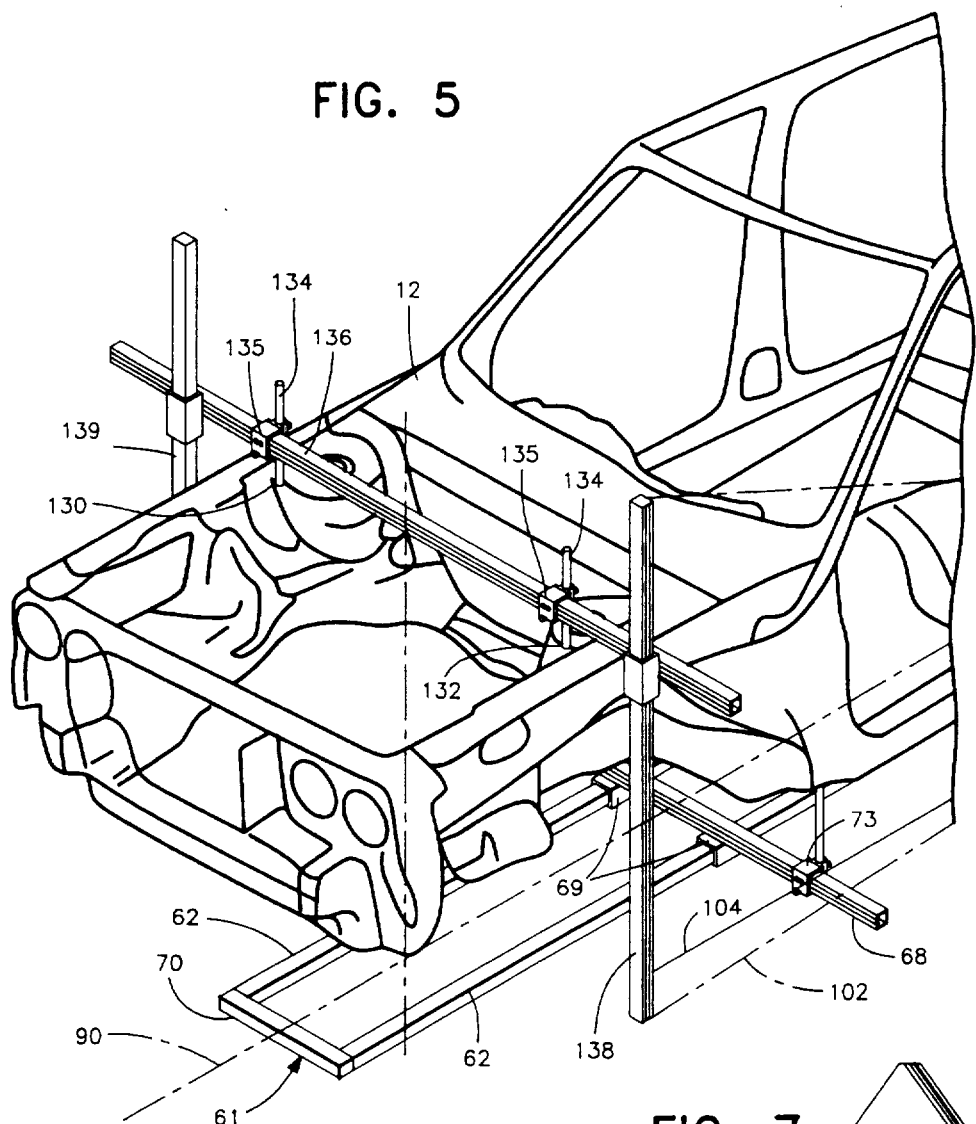
FIG. 5
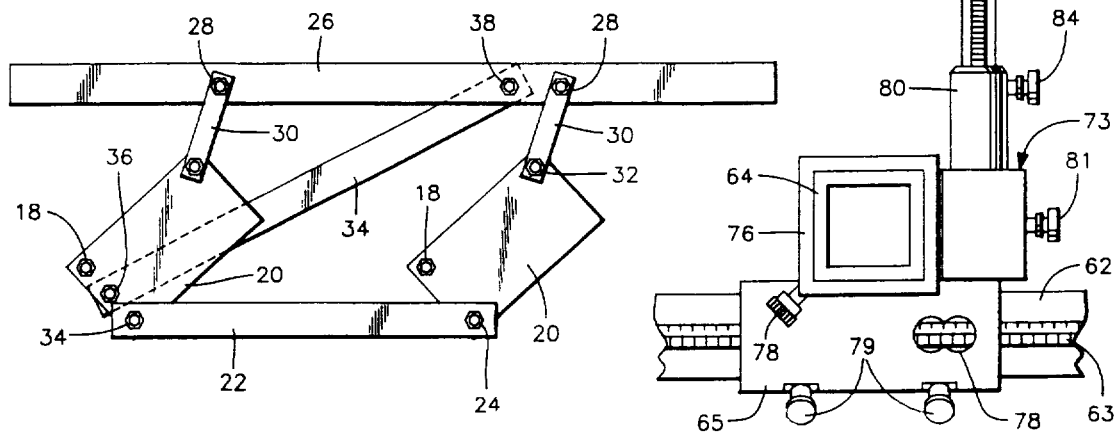
FIG. 6
FIG. 7

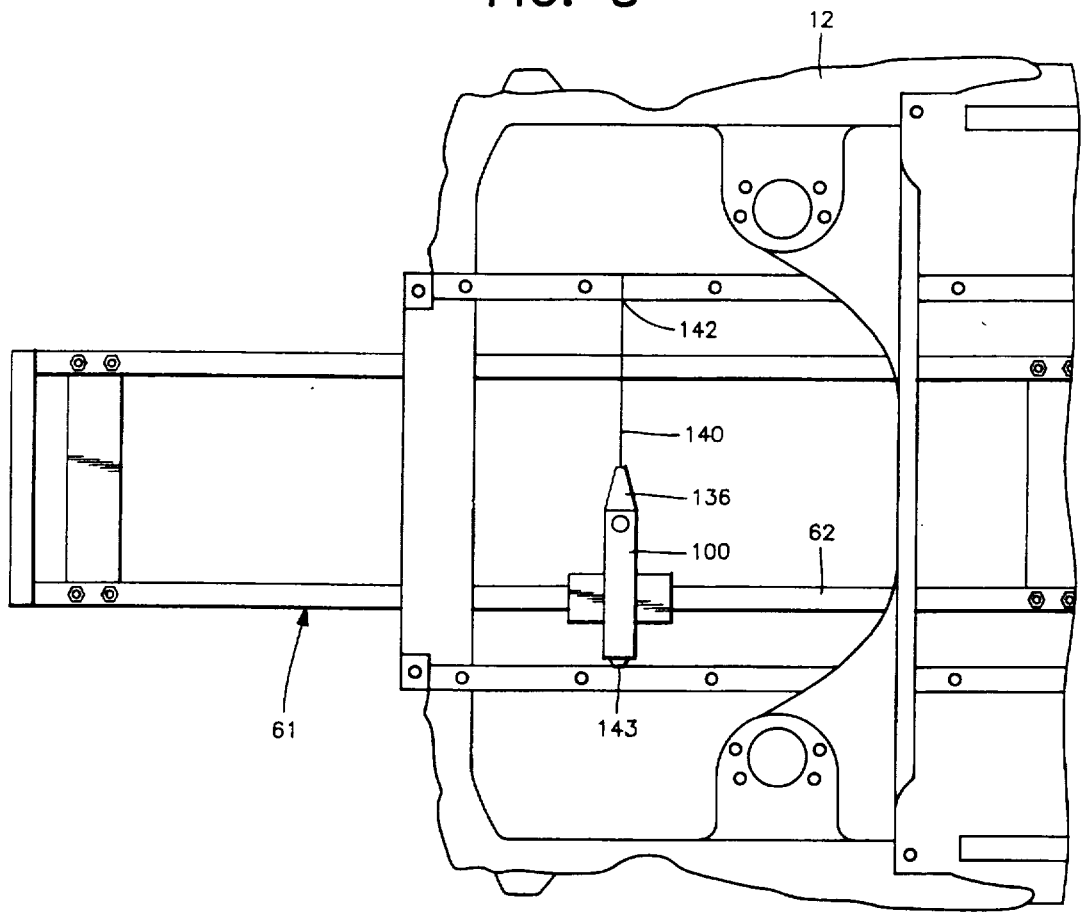
FIG. 8
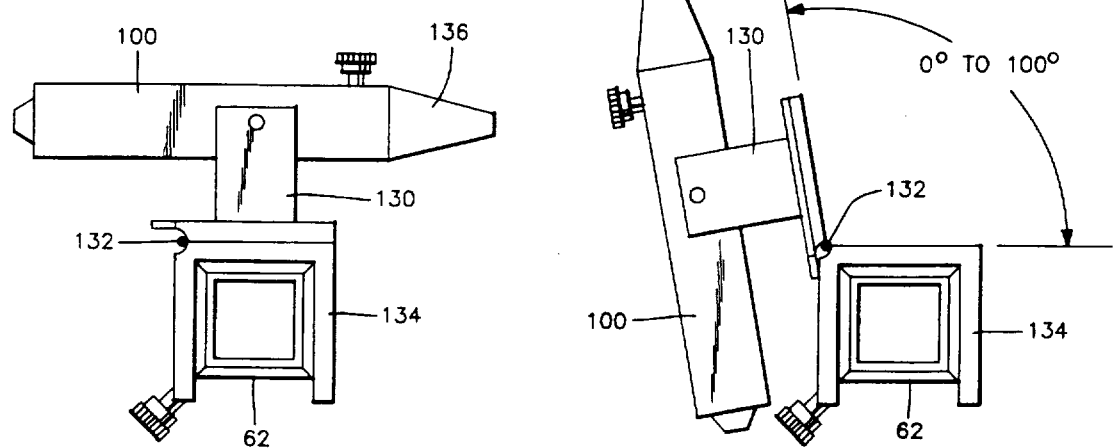
FIG. 9
FIG. 10

APPARATUS FOR AND METHOD OF MEASURING VEHICLE REFERENCE POINTS

BACKGROUND OF THE INVENTION

1. Field of the Invention

This invention relates to a vehicle support rack for support of vehicles, especially automobiles, small trucks and the like, upon which frame and/or unibody straightening repairs are to be made. The invention further includes a support and lift assembly for a vehicle body/frame reference point measuring jig to be mounted from the rack and vertically adjusted relative thereto, laser beam plane generating structure adjustably supported from the jig for generating either a vertical laser beam plane or a horizontal laser beam plane parallel to a center longitudinal datum line determined by the jig, and a hand-held measuring probe to be used in conjunction with the generated laser beam plane for measuring vehicle reference point distances relative to a datum line or plane.

2. Description of Related Art

Various different forms of support racks and accessories therefor to be used in checking specific measuring points of a vehicle frame and/or a unibody heretofore have been provided, such as those disclosed in U.S. Pat. Nos. 4,712,417, 4,932,236, 5,027,639, 5,199,289 and 5,239,854. In addition, a measuring probe of the general type disclosed in the instant application is disclosed in U.S. Pat. No. 4,839,590.

The probe disclosed in U.S. Pat. No. 4,839,590 has been modified by providing the free end of the wand thereof with a vehicle body point contacting member, by providing the probe with a digital readout display mounted upon the probe itself and including memory capability, and by adapting the probe for battery operation thus making it fully portable.

SUMMARY OF THE INVENTION

The support rack of the instant invention is generally conventional in design, but includes jig support and elevating structure mounted thereon upon which a frame or body point measuring jig may be removably mounted for up and down adjustment relative to the rack. The jig is supported from the support and elevating structure for ready shifting, in a horizontal plane, both longitudinally and transversely of the associated rack. The jig support and elevating structure is unique in that once the measuring jig has been supported therefrom and shifted to the approximate desired position relative to the associated vehicle, the jig support and elevating structure is operable to raise the jig through a substantially vertical path.

The measuring jig operatively supports a laser beam projecting apparatus from one of the longitudinal or transverse members of the jig which projects a laser beam through an arc plane. The laser beam plane projecting apparatus causes the laser beam to extend through an angular arc to generate an arc beam plane which may be either horizontal or vertical and parallels the longitudinal center plane of the vehicle mounted upon the rack and relative to which the jig has been precisely positioned. This longitudinal center plane of the vehicle is often referred to and known as the "datum line", and these terms will be used interchangeably in this application. Furthermore, the laser beam plane projecting apparatus may be mounted from attendant mounting structure mounted upon either a longitudinal or transverse support member of the jig for angular displacement of the laser beam plane projecting apparatus about an axis paralleling that jig support member.

An important object of this invention is to provide the combination of a measuring jig and measuring jig support and elevating structure for a vehicle repair rack which will enable quick and precise positioning of the measuring jig in a horizontal plane relative to the support rack and ease in elevating the measuring jig into precise position relative to a vehicle supported from the vehicle repair rack.

Another very important object of this invention is to provide a jig support and elevating structure which will be capable of substantially vertically raising a measuring jig supported therefrom relative to a vehicle support rack from which the jig support and elevating structure is mounted.

Yet another important object of this invention is to provide an improved hand-held measuring probe to be used in conjunction with a laser beam plane projecting apparatus readily supportable from either a longitudinal or transverse support member of the measuring jig and precisely positionable along that support member.

A further object of this invention is to provide a laser beam plane projecting apparatus in accordance with the immediately preceding object and operable to generate either a vertical laser beam plane or a horizontal laser beam plane.

Yet another very important object of this invention is to provide a mount for the laser beam plane projecting apparatus whereby it may be readily mounted from either a longitudinal jig support member or a transverse jig support member for adjustable positioning therealong and further wherein the laser beam plane projecting apparatus may be angularly displaced relative to the mounting member about an axis generally paralleling the longitudinal or transverse jig support member from which the mount is supported.

Another object of this invention is to provide an improved method of determining, in conjunction with a laser beam plane projecting apparatus operative to project a vertical laser beam parallel to the longitudinal datum line of an associated vehicle, the spacing of a body location point transversely of the longitudinal vehicle datum line.

Another important object of this invention is to provide a method for quickly comparing specific left and right side body location points relative to a central longitudinal vertical plane of an associated vehicle.

Yet another important object of this invention is to provide a method of comparing the relative longitudinal positioning of corresponding opposite side body or frame points.

A final object of this invention to be specifically enumerated herein is to provide an apparatus and method in accordance with the preceding objects which will conform to conventional forms of manufacture and be easy to use, which will be of simple construction and operable by a single work person so as to provide a device and method that will be economical, quickly useable, and long lasting and which may be operated by relatively inexperienced work persons, relatively trouble free in operation and offer dependable results.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a fragmentary perspective view similar to the left hand portion of FIG. 2, but illustrating the manner in which a pair of corresponding vehicle measuring points may be checked through the utilization of a horizontal support bar and a depending vertical side bar with which the vertical laser beam plane is registered.

FIG. 6 is a side elevational view of the assemblage illustrated in FIG. 4.

FIG. 7 is a fragmentary side elevational view illustrating the manner in which one of the vehicle reference point indicators of the instant invention may be supported from the associated jig.

FIG. 8 is a fragmentary top plan view of the left hand portion of the assemblage illustrated in FIG. 2 and with the pivotable laser beam plane generating structure supported from a longitudinal member of the jig and swingable about a longitudinal axis for comparing lateral alignment of opposite side vehicle frame or body point locations.

FIG. 9 is a side elevational view of the laser beam plane generating or projecting apparatus illustrated in FIG. 8 shown in a horizontal position.

FIG. 10 is a side elevational view similar to FIG. 9 but illustrating the laser beam generating apparatus in a position swung approximately 100° from the position thereof illustrated in FIG. 9. And, FIG. 11 is a schematic, vertical transverse sectional view illustrating the manner in which specific opposite side longitudinal frame or body point locations may be compared.

DESCRIPTION OF THE PREFERRED EMBODIMENTS

Figure 1:
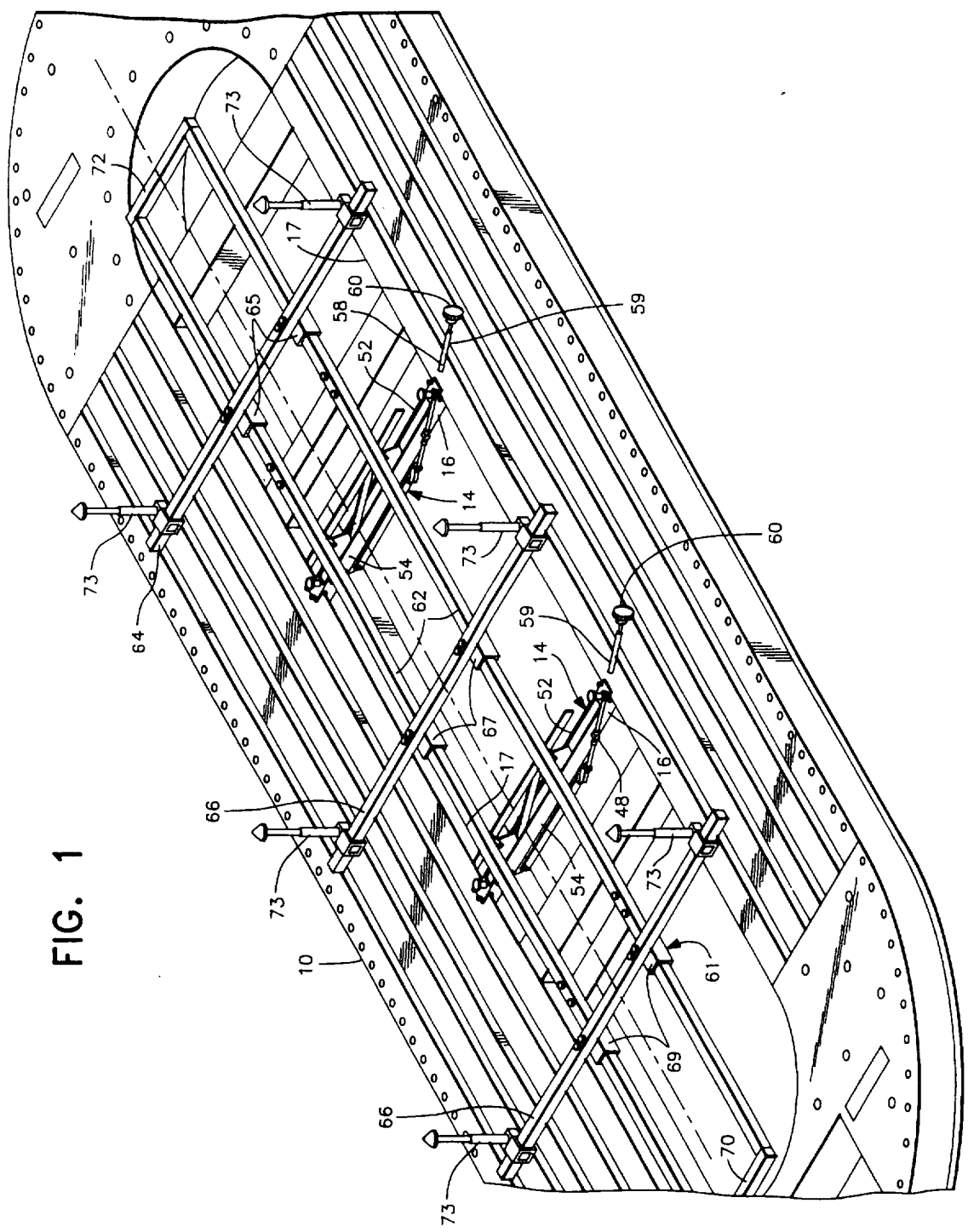
FIG. 1 is a fragmentary, schematic perspective view of a typical form of vehicle repair rack from which a substantially conventional reference point measuring jig is supported for ease in shifting both longitudinally and transversely of the rack through the utilization of an improved jig supporting and elevating structure in accordance with the instant invention.
Figure 2:
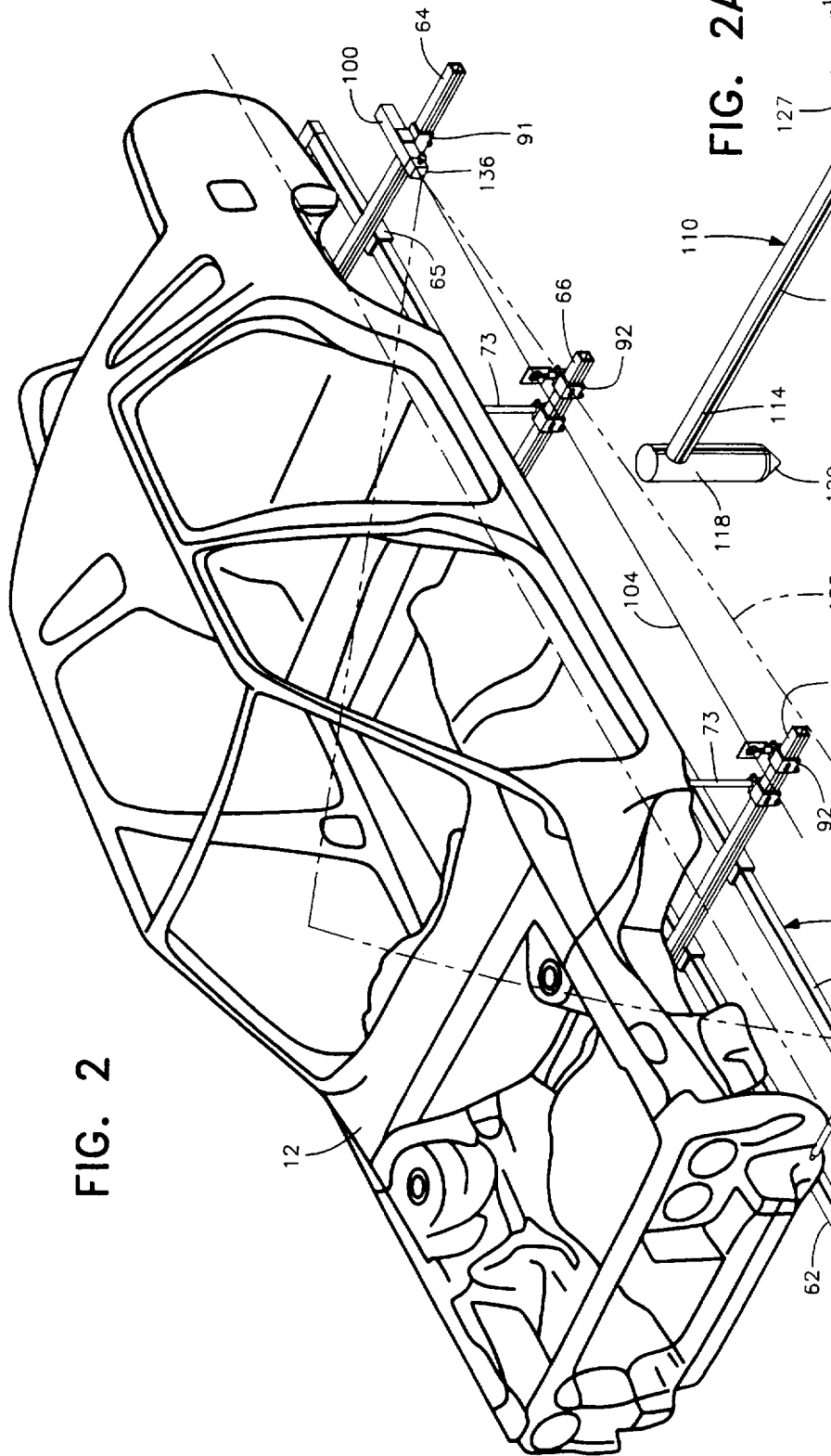
FIG. 2 is a perspective view of a conventional vehicle reference point measuring jig illustrating the manner in which a vertical laser beam plane is generated parallel to the center longitudinal datum line (or plane) of the vehicle body, such as an automobile, and with a first form of portable measuring probe of the instant invention positioned to indicate the horizontal lateral spacing of various vehicle body measuring points relative to a vertical plane containing the center longitudinal datum line of the vehicle body.

Referring now more specifically to the drawings, numeral 10 in FIG. 1 generally designates a conventional form of rack upon which to support, through the use of jack stands or the like (not shown), a vehicle or vehicle body 12, such as an automobile body, see FIGS. 2, 5 and 8. The vehicle or body is supported for frame measurements and/or straightening repairs to be made.

The rack, as shown in FIG. 1, supports a pair of transverse jig support and elevating structures 14 including elongated transverse base members 16 clamp engaged with corresponding adjacent inner marginal portions 17 of the rack 10. Each of the jig support and elevating structures 14 includes a pair of rectangular support plates or members 20 pivotally supported as at 18 from the corresponding base member 16, see FIG. 4. In addition, a connecting link 22 is provided and has its opposite ends pivotally anchored to the lower corners of the plates 20 as at pivot pin 24. A horizontal support and lift bar 26 also is included with each jig support and elevating structure 14 and has its opposite end portions pivotally supported as at 28 from the upper ends of connecting links 30 having their lower ends pivotally supported from the upper corners of the rectangular plates 20 as at 32. An inclined control link 34 has one end anchored to a first of the plates 20 as at 36 and a second end thereof pivotally anchored to the support and lift bar 26 as at 38.

Figure 4:
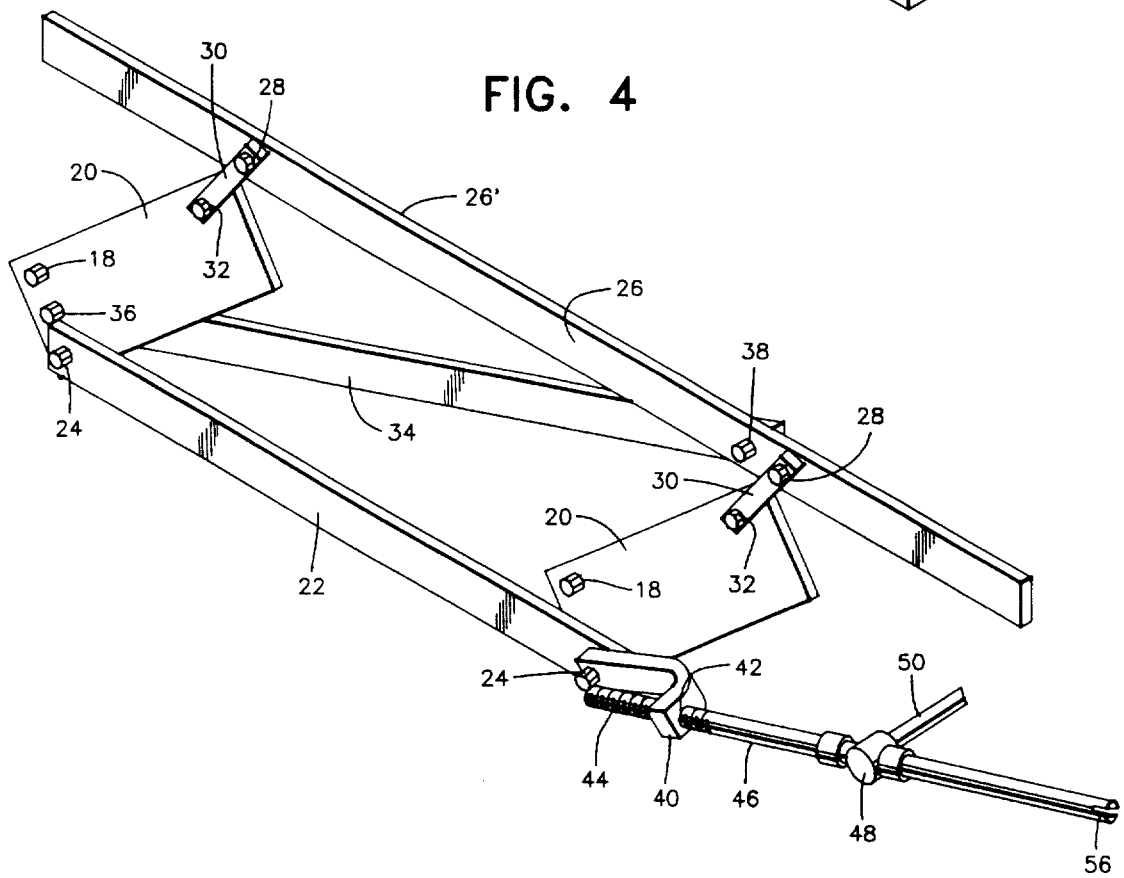
FIG. 4 is an enlarged perspective view of the jig support and elevating structure illustrated in FIG. 1 with the base mounting portion thereof removed.

An L-shaped bracket 40 has the free end of the long leg thereof pivotally anchored to the right end of the connecting link 22 and the right rectangular plate 20 as at 24, see FIG. 4, and the short leg of the bracket 40 has a threaded aperture 42 formed therethrough. The threaded end 44 of an operating shaft 46 is threaded through the aperture 42 and an intermediate length portion of the operating shaft 46 has a fitting 48 mounted thereon against axial shifting therealong and through which the operating shaft 46 is journaled. The fitting 48 includes a reduced diameter mounting pin portion 50 which extends through apertures (not shown) provided therefor in both side plates 52 and 54 of the base member 16.

The end of the operating shaft 46 remote from the bracket 40 includes a diametric slot 56 formed therein to receive a diametric pin (not shown) carried by the hollow end 58 of an extension shaft 59 having an operating knob 60 mounted on the outer end thereof. The extension shafts 59 are readily engagable with and disengagable from the slotted ends of the operating shaft 46 and may be used to turn the latter.

Accordingly, it will be noted that turning an operating shaft 46 with the corresponding extension shaft 59 will cause the L-shaped bracket 40 to shift to the right or left as viewed in FIG. 4. This causes the connecting link 22 to shift in the same direction, through pivot pin 24, relative to the corresponding base member. Accordingly, the associated support and lift bar 26 will be raised or lowered, substantially vertically depending on the direction of rotation of the operating shaft 46 by knob 60.

The support and lift bars 26 include planar upper lift surfaces 26' and are used to support a measuring jig referred to in general by the reference numeral 61. The measuring jig 61 includes opposite side longitudinal members 62 having longitudinal scales 63 thereon, see FIG. 7, and three transverse members 64, 66 and 68. As shown in FIGS. 1 and 7 the transverse members 64, 66 and 68 are preferably mounted on the longitudinal members 62 through tubular mounts 65, 67 and 69, respectively, so that the transverse members can be selectively positioned at points spaced longitudinally along longitudinal members 62. The opposite ends of the longitudinal members 62 are interconnected by end structures 70 and 72.

The transverse members 64, 66 and 68 each have a vertical locating or sensing and measuring device 73 mounted on the outer ends thereof and, see FIG. 7. The sensing and measuring devices 73 are provided preferably on at least two transverse members, such as members 66 and 68 and include slidable mounts 76. The mounts 65, 67, 69 and 76 are substantially identical and include windows 78 therein for viewing the corresponding scales 63 and set screws 79 for retaining the devices 73 in adjusted position along the corresponding transverse members. Further, each measuring device 73 includes an upright base 80 removably mounted on the mount 76 by set screw 81 and from which an upstanding scaled upright 82 is supported for vertical adjustment. Each base 80 includes a set screw 84 for maintaining the associated upright 82 in vertically adjusted position, and each upright 82 includes an upper end body engaging member 86 positioned on the top thereof.

When the vehicle or vehicle body 12 is properly supported rigidly, through the utilization of jack stands or the like, from the rack 10, the measuring gauge or jig 61 is elevated upwardly, after the measuring devices 73 have been properly adjusted horizontally and uprights 82 properly adjusted vertically according to an available measuring chart for the vehicle 12. Elevation of the jig 61 is continued until the body engaging members 86 engage predetermined points along the underside of the vehicle 12. As the jig 61 is finally raised into position beneath the vehicle 12, it may be necessary to horizontally shift the jig 61 laterally and/or longitudinally relative to the support and lift bars 26 so that it will be properly positioned relative to the vehicle frame. This may be readily carried out manually inasmuch as the smooth undersides of the longitudinal members 62 may easily slide relative to the upper surfaces or edges 26' of the support and lift bars 26.

When using four measuring devices 73, for example on beams 66 and 68, and assuming that one of the body engaging members 86 will not properly register with the predetermined point on the underside of the vehicle 12 due to body damage, at least the three remaining body engaging members 86 normally register properly with and contact the predetermined points on the underside of the vehicle. Thus, the jig 61 can be precisely positioned relative to the vehicle 12 in order to properly define the longitudinal datum line or vertical datum plane 90, see FIG. 2, from which a majority of subsequent body point measurements will be made.

After the jig 61 has been properly positioned relative to the vehicle 12, a slide mount 91 is adjustably positioned on the transverse member 64 and targets 92 are mounted in similar adjusted positions on the transverse members 66 and 68. The mount 91 supports a conventional laser beam plane generator 100 therefrom capable of generating a fan or arc shaped laser beam plane 102 including a center slightly enlarged pencil beam 104. The pencil beam 104 is aligned with the targets 92. When the generator 100 is properly mounted on the transverse member 64 and the targets 92 are properly mounted on the transverse members 66 and 68, the generator 100 casts the planar fan-shaped beam or plane 102 in a vertical plane parallel the datum line 90 as well as a vertical plane containing the datum line 90.

Figure 2A:
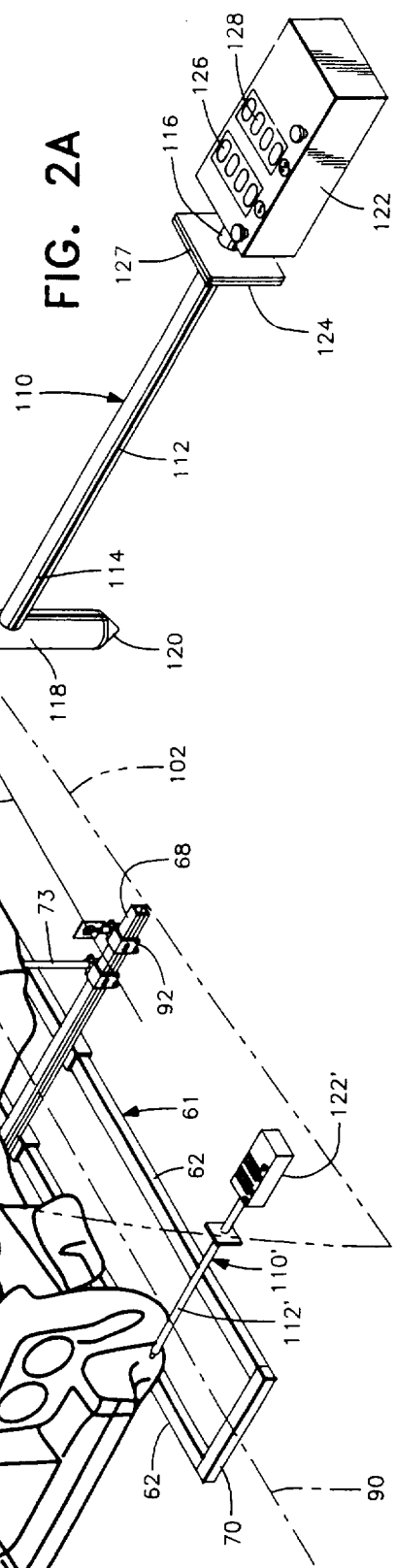
FIG. 2A is an enlarged perspective view of a slightly modified form of measuring probe in accordance with the present invention in which an adapter is provided on the free end of the wand portion to more readily register the wand vertically with predetermined vehicle body measuring points.

With attention now invited more specifically to FIGS. 2 and 2A, a hand held probe is shown in FIG. 2A and is referred to by the reference numeral 110. The probe 110 includes an elongated wand 112 having free and base ends 114 and 116. The free end 114 removably supports an angularly displaceable laterally directed body engaging member 118 including a conical tip 120 on its free end. The base end 116 supports a control housing 122 and a slide member 124 is slidably mounted on the wand 112 for movement therealong and frictionally engages the wand 112 for frictionally retaining an adjusted position on the wand 112. The slide member 124 is generally in the form of a rectangular plate and includes a center peripheral line 126 extending thereabout. The probe 110 comprises a modified probe such as that disclosed in U.S. Pat. No. 4,839,590. Modifications which have been made to the probe 110 include battery operation and a first digital readout 127 as well as a second memory digital readout 128. The readout 127 indicates the positioning of the slide member 124 along the wand 112 relative to a plane normal to the wand 112 and passing through the center of the conical point 120.

The probe 110' illustrated in FIG. 2 is identical to the probe 110, except that the body engaging member 118 has been removed from the free end of the wand 112' thereof, thereby adapting the wand 110 for engagement with a vertical surface of the body 12 rather than a horizontal surface with which the body engaging member 18 is adapted to be used. Of course, the free end of the wand 112' lies in a plane normal to the wand 112' which corresponds to the plane containing the center of the conical point or tip 120. This ensures that all measurements are consistent with the reference line 126.

Once the laser beam plane 102 has been generated, the probe 110 and the probe 110' may be used to measure the spacing of horizontal and vertical surface points, respectively, of the body 12 outwardly from a center vertical plane of the body 12 coinciding with the datum line 90, the mount 91 and the targets 92 being mounted on the transverse members 64, 66 and 68 at predetermined distances laterally of the datum line 90. Of course, after body point measurements have been made on the left side of the vehicle 12, the generator 100 may be set up on the right side of the body 12 and utilized in conjunction additional targets 92 mounted on the right side in order to form a right side laser beam plane with which corresponding measurements may be made on the right side of the vehicle 12 utilizing the probes 110 and 110'.

By utilizing the hand held probes 110 or 110', numerous measurements on opposite sides of the vehicle 12 may be quickly made for comparison with measurement charts relating to the vehicle 12. By these types of measurements, necessary body straightening pulls may be made on the vehicle 12, after which the body point measurements may again be made utilizing the probe 110 or the probe 110'.

With attention now invited more specifically to FIG. 5, vertical positioning of opposite side body points 130 and 132 may be determined by precisely mounting vertical body point contacting rods 134 from a horizontally extending transverse beam 136 which suspends fixed vertical beams 138 and 139. The body point contacting rods 134 are preferably adjustable horizontally on beam 136 through collars 135 and vertically with set screws in the collars. When the rods 134 are properly spaced apart, properly adjusted vertically relative to the transverse beam 136, and the vertical beam 138 is properly adjusted along the transverse beam 136 from the adjacent rod 134 and is supported at right angles relative to the transverse beam 136, the narrow laser beam plane 102 should contact the lateral center of the rear face of the vertical beam 138 over its full length, if the body points 130 and 132 are disposed at identical elevations. If not, the laser beam plane 102 will be rotated off center, indicating that one of body points 130 and 132 is lower than the other, thus requiring adjustment. This usage of the laser beam plane 102 is carried out to determine if identical body points such as body points 130 and 132 on opposite sides of the vehicle 12 are disposed at the same elevation.

Figure 3:
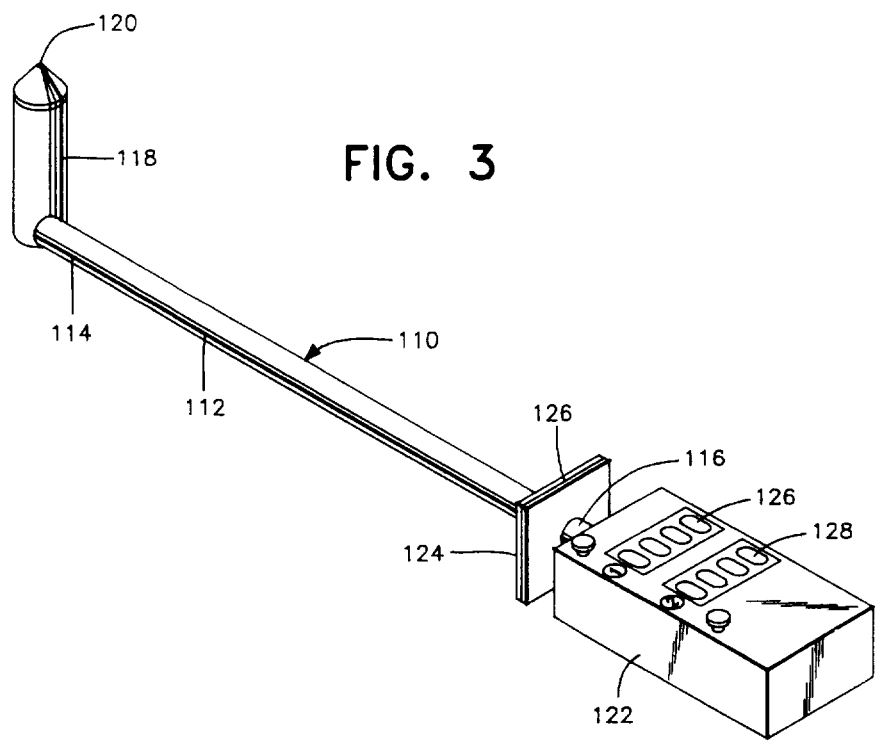
FIG. 3 is a further perspective view of the modified form of the measuring probe illustrated in FIG. 2A showing the adapter in a 180° rotated position.

With attention now invited more specifically to FIG. 3, it may be seen that the probe 110 may have the body engaging member 118 thereof mounted on the free end 114 of the wand 112 in 180° rotated position relative to the position of the body engaging member 118 shown in FIG. 2A. When the probe 110 has its body engaging member 118 mounted in this position, underside points of the vehicle 112 may be measured as to their distance from a vertical plane passing through the longitudinal datum line 90.

With attention now invited more specifically to FIGS. 8–11, the generator 100 is supported from a bracket 130 which is in turn pivotally mounted as at 132 from a mount 134 corresponding to the mount 91 and which may be mounted from and adjustably positioned along either of the longitudinal members 62 of the jig 61. The bracket 130 may be swung from the position thereof illustrated in FIG. 9 to the position thereof illustrated in FIG. 10 so as to angularly displace the generator 100 approximately 100° to the stop position shown in FIG. 10.

Further, the nose 136 of the generator 100 may be rotated precisely 90° about the longitudinal axis of the generator 100 so that the laser beam plane 102 will be horizontally disposed rather than vertically disposed. In this way the generator 100 may be used to measure and/or identify displacements in the vertical direction.

Figure 11:
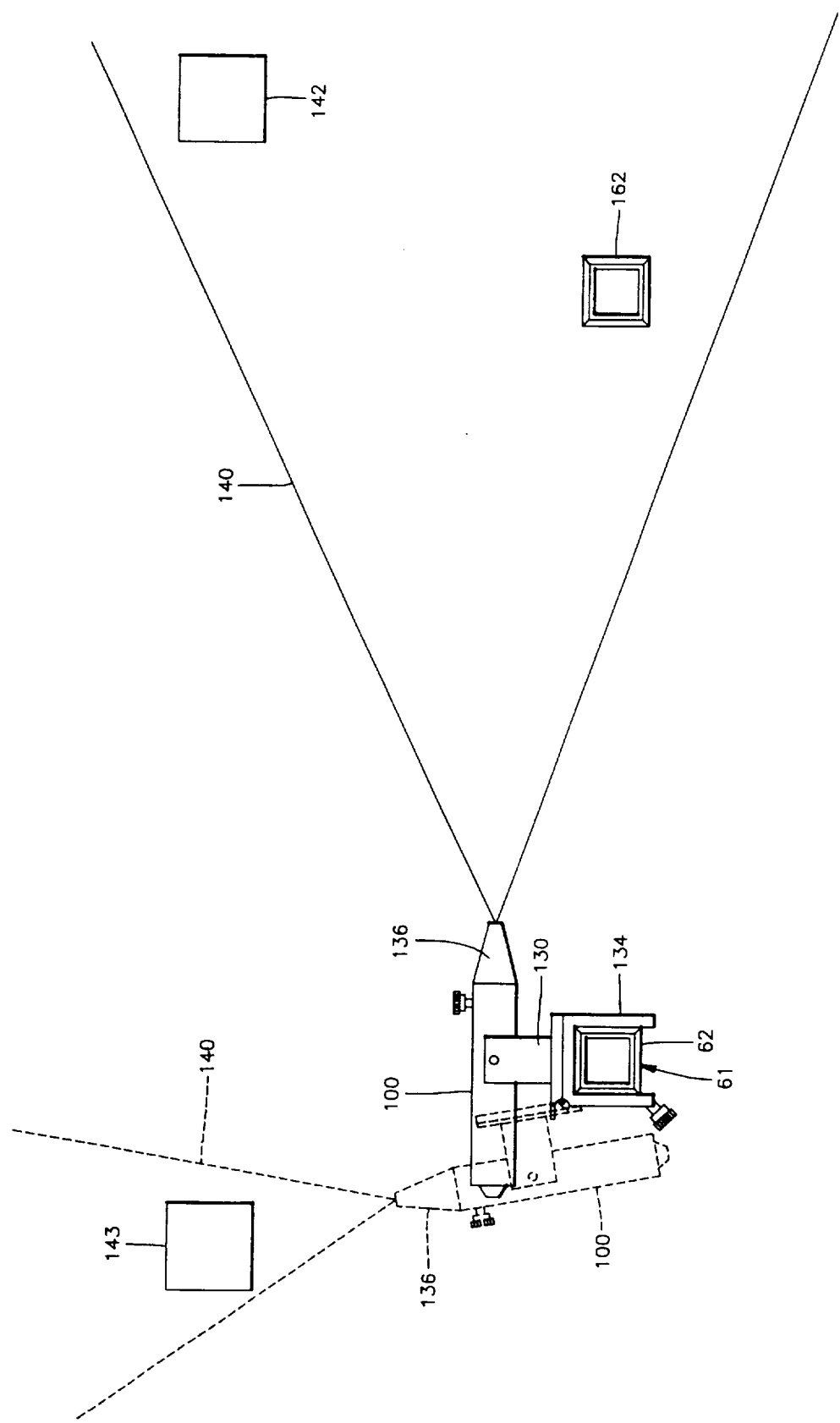

In the usage of the generator 100 in FIGS. 8 and 11, the mount 134 is mounted on a selected longitudinal member 62 of the jig 61 in proper position spaced therealong and the generator 100 has its nose 136 angularly adjusted to generate a vertical laser beam plane 140 normal to the datum line 90, whereby the laser beam plane intersects with a predetermined subframe point 142 on the left side of the vehicle 12. Thereafter, the bracket 130 is pivoted to the position thereof illustrated in FIG. 10 so that the laser beam plane 140 will be cast upwardly toward the subframe point 143 on the left side of the vehicle 12 corresponding to the point 142. Of course, any misalignment of the laser beam plane 140 in this position of the generator 100 and the predetermined left side body point 142 will indicate that the left side body point 143 is misaligned longitudinally of the vehicle 12 and that a required subframe straightening procedure must be carried out. Of course, this manner of utilizing the laser beam plane generator 100 may be carried out along the full length of the vehicle 12 in order to check the relative positions of undamaged right side subframe or body points with corresponding left side subframe or body points in the event the left side of the vehicle 12 is damaged.

The method of utilizing the laser beam plane generator 100 as illustrated in FIG. 8 saves many work hours in determining if longitudinal pulls are needed to restore the proper body point dimensions of the underside of a damaged vehicle. These comparative right and left side body point positions may be made the full length of the vehicle 12 in a manner of minutes by only a single work person. Further, if two laser beam plane generators 100 can be simultaneously mounted on the right and left side of the vehicle in the manner illustrated in FIG. 2, comparative lateral measurements of corresponding right and left side body points of the vehicle 12 also may be made the full length of the vehicle in a matter of minutes.

Still further, the same series of quick measurements may be made both in the manner illustrated in FIG. 2 and the manner illustrated in FIG. 8 after the needed subframe and or body pulls have been made and also during the time a body pull is being made. Thus, the total labor in effecting proper subframe and body pulls is substantially reduced.

Of course, if a rack such as rack 10 is not available and floor anchored jack stands are used for supporting the vehicle 12 above a floor surface, the base members 16 also may be stationarily floor mounted for support of the jig 61 from the lift bars 26 thereof.

The foregoing is considered as illustrative only of the principles of the invention. Further, since numerous modifications and changes readily will occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination, an elongated, generally horizontal surface structure for stationarily supporting a vehicle body thereon, a pair of support and elevating structures supported from said surface structure, said support and elevating structures each including a horizontal base member stationary relative to said surface structure and elongated, horizontal support structure extending transversely of said surface structures and mounted from said base members for substantially vertical adjustment relative thereto, said horizontal support structures including horizontal upwardly facing lift surfaces, an elongated measuring jig, said measuring jig including a pair of laterally spaced apart and interconnected elongated longitudinal positioning bars extending longitudinally of said surface structures and having at least two transverse positioning bars supported therefrom at predetermined adjusted points spaced along said longitudinal positioning bars, each of said transverse positioning bars including upwardly projecting locating structure supported from the opposite ends thereof for predetermined adjusted positioning therealong, said longitudinal positioning bars including horizontal under surfaces extending generally normal to and removably slidingly supported from said lift surfaces for both longitudinal and transverse sliding shifting of said jig relative to said lift surfaces, said locating structure being adapted to engage predetermined under side portions of said vehicle body.

2. The combination of claim 1 wherein said generally horizontal surface structure comprises the upper surface portions of a vehicle repair rack.

3. The combination of claim 1 wherein said base members each comprise an elongated base member from which corresponding first end portions of a pair of elongated support structures are pivotally supported for angular displacement about horizontal axes spaced along and disposed transverse to the corresponding base member, each horizontal support structure end being pivotally supported from the upper end of a corresponding elongated, inclined connecting link and each connecting link lower end being pivotally supported from the second end portion of a corresponding elongated support structure, and an elongated control link pivotally connected at one end to one of said elongated support structures and at the other end to the remote horizontal support structure end, an elongated connecting link extending between and pivotally connected to said support members at corresponding points spaced from the pivot points of said first ends relative to said base member, the pivot point of said control link one end relative to said one support structure being spaced, generally, between the pivot axis of said one support member relative to said base member and the pivot axis of said connecting link relative to said one support structure, and means operative to adjustably angularly displace one of said support structures relative to said base member.

4. A vehicle support rack including opposing laterally spaced inner longitudinal marginal portions, a measuring jig support including a pair of elongated base members each adapted to span between and be supported from a corresponding pair of inner marginal portions of said rack with said base members spaced along said rack, the opposite ends of each of said base members having a first pair of corresponding lower, inclined elongated support structure ends pivotally supported therefrom for angular displacement about horizontal axes extending transversely of said base member, an elongated horizontal support and lift structure having opposite ends pivotally supported from elongated, upstanding connecting link upper ends spaced longitudinally therealong, the lower ends of said connecting links being pivotally anchored relative to the upper ends of said support structures, an inclined control link having one end pivotally anchored to one of said support structures adjacent the pivot connection thereof with said base member and the other end thereof pivotally anchored to the remote end of said support and lift structure, an elongated connecting link having a first end pivotally connected to said one support structure on the side of the pivot connection thereof with said control link opposite the pivot connection thereof with said base member and the other end thereof pivotally connected to the lower end of the other support structure, and means operative to adjustably angularly displace a first of said support members relative to said base member.

5. In combination, a vehicle body having a specific stationary datum line established therewith, means operative to cast a visual laser beam plane parallel to said datum line, a hand-held measuring probe including an elongated wand having specific body point contact means at one end, a slide member mounted on said wand for selective positioning therealong, a readout means on said wand remote from said body contact means operable to render a measurement reading indicating the positioning of said slide member along said wand from said body point contact means, said measuring probe being supported in position with said wand substantially normal to said plane and with said body point contact means engaged with a selected point on said body, said slide member being disposed in said plane.

6. The combination of claim 5 wherein said datum line extends, horizontally, longitudinally of said vehicle and said plane comprises a vertical plane.

7. In combination, a vehicle body defining a central longitudinal axis, laser beam generating means shiftably supported relative to said vehicle body below said axis and for adjustable positioning along a path paralleling said axis and spaced between corresponding opposite side underside reference points of said vehicle body and operative to project, upwardly towards said vehicle body, a visual laser beam normal to said axis, said laser beam generating means including support means therefor mounted relative to said vehicle for adjustable angular positioning of said laser beam generating means about a second axis paralleling said longitudinal axis, whereby said laser beam generating means may be aligned with predetermined underside reference point on one side said vehicle body central longitudinal axis and then swung about said second axis for visual positioning determination of said beam relative to a second corresponding body underside reference point on the other side of said.

8. The combination of claim 7 wherein said laser beam generating means projects a sector shaped beam and includes means operative to adjustably angularly displace said laser beam plane about an axis disposed in said laser beam plane and bisecting said sector shaped beam.

9. The method of comparing predetermined corresponding right and left vehicle body underside location points, said method including defining a longitudinal central datum line of said vehicle, projecting a laser beam upwardly toward one side of said vehicle body from beneath the latter with said laser beam normal to said datum line and intersecting with one of said points, angularly displacing said laser beam about an axis paralleling said datum line to cast said beam toward the other of said points, and then noting visually whether said beam intersects with said other point.

10. The method of determining lateral spacing of a predetermined vehicle body location point relative to a central, longitudinal vertical plane of said vehicle body, said method including determining a longitudinal vehicle datum line, projecting a laser beam plane longitudinally of said vehicle body paralleling said plane and disposed laterally outwardly of said vehicle body, manually supporting an elongated wand having specific body contact means at one end with said wand normal to and intersecting said laser beam plane and with said contact means engaged with said location point, and visually noting and recording the distance along said wand, from said contact means, said laser beam plane intersects said wand.

11. The method of claim 10 wherein said beam of plane comprises a vertical plane.

* * * * *